United States Patent Office 2,971,975
Patented Feb. 14, 1961

2,971,975
METHOD OF PREPARING SODIUM SALTS OF DIETHYLSTILBESTROL DIPHOSPHATE

Norman D. Dawson, Elkhart, Ind., assignor to Miles Laboratories, Inc., Elkhart, Ind., a corporation of Indiana No Drawing. Filed Aug. 30, 1955, Ser. No. 531,579

3 Claims. (Cl. 260—461)

This invention relates to the production of salts of diethylstilbestrol diphosphate and more particularly to an improved process for producing the tetra-sodium salt of diethylstilbestrol diphosphate.

The preparation of diethylstilbestrol diphosphate by prior art techniques such as are described in U.S. Patent No. 2,234,311, and other previously used modifications has not been entirely satisfactory for a number of reasons. Thus, utilizing those prior art techniques and procedures the isolation of the free acid has been troublesome since excessive quantities of concentrated hydrochloric acid were required to produce a product that could be collected by filtration.

Furthermore, the large excess which was required did not always insure the formation of material which could be filtered and washed in a reasonable amount of time. And additionally, the large amount of acid required was detrimental to the process equipment particularly to the cloth used in the filter process.

In accordance with my improved process, diethylstilbestrol diphosphate can be readily isolated in the form of its tetra-sodium salt, the product having such a character that it is readily collected by filtration. The salt in the form of injectable aqueous solutions has utility as an estrogen.

Additional advantages of my new process are that no mineral acid is required, there is greater latitude in the type of filtering apparatus which may be used, and the operational time is substantially reduced. Furthermore, where an ampuled product is to be made, it is necessary merely to dilute the resulting salt with the correct amount of water.

Preparation of the tetra-sodium salt of diethylstilbestrol diphosphate in accordance with my improved method is illustrated by the following reactions:

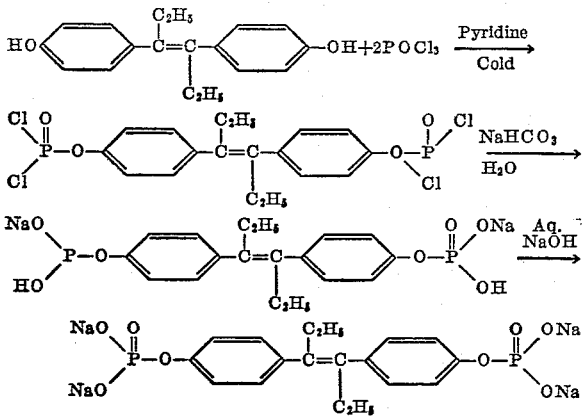

The following example further illustrates my invention:

*Example 1*

A one liter three-neck flask equipped with a stirrer, reflux condenser, thermometer, addition tube and a calcium chloride tube was charged with 125 ml. of 2° pyridine. The solvent was cooled to 5° C. and 35 g. of phosphorus oxychloride added dropwise (temp. 5–15° C.). The resulting slurry was cooled to 3–5° C. and a solution of 25.5 g. of diethylstilbestrol in 63 ml. of 2° pyridine (temp. of solution 45° C.) dropped in over a 45 minute period. After 15 minutes at 3–5° C., the reaction mixture was allowed to warm to room temperature over one hour and then poured slowly into a stirred slurry of 128 g. of sodium bicarbonate and 500 ml. of water. The reaction mixture was stripped under reduced pressure (50 mm.) using a water bath (temp. 45–60° C.) until 275 ml. of distillate had been collected. The reaction mixture was filtered through a bed of filter-Cel to give a clear solution; the solution measured 540 ml. and had a pH of 8.4. Two hundred (200) ml. of the solution was treated dropwise with 5% caustic solution until the solution had a pH of 10.0. The alkaline solution which now had a volume of 284 ml. was shaken with 270 ml. of acetone and the mixture allowed to stratify. The lower layer (85 ml.) was drawn off and treated with 120 ml. of methanol. After a few minutes stirring, the tetra-sodium salt separated as a white crystalline solid. The salt was collected, washed thoroughly with methanol and air-dried to constant weight.

I claim:

1. A process for producing the tetra-sodium salt of diethylstilbestrol diphosphate which comprises reacting diethylstilbestrol with phosphorus oxychloride, adding the resulting product to an aqueous solution of sodium bicarbonate, removing a portion of the water and filtering the remainder to provide a reaction mixture having a pH of about 8.4, treating the last said reaction mixture with sodium hydroxide until a pH of about 10.0 is reached, and separating the tetra-sodium salt of diethylstilbestrol diphosphate from the resulting mixture.

2. A process for the production of the tetra-sodium salt of diethylstilbestrol diphosphate which comprises reacting diethylstilbestrol with phosphorus oxychloride in the presence of pyridine, adding the resulting reaction mixture to an aqueous slurry of sodium bicarbonate, removing at least a portion of the water therefrom, filtering the reaction mixture to give a clear solution having a pH of about 8.4, treating the resulting solution with a caustic solution until a pH of 10.0 is reached, precipitating the tetra-sodium salt, and separating the tetra-sodium salt therefrom by filtration.

3. A process for the production of the tetra-sodium salt of diethylstilbestrol diphosphate which comprises initially forming the tetrachloride salt of diethylstilbestrol diphosphate by slowly adding diethylstilbestrol to cooled phosphorous oxychloride in the presence of pyridine and allowing the reaction mixture to warm to room temperature, then adding the reaction mixture to an aqueous slurry of sodium bicarbonate, filtering the reaction mixture to obtain a clear solution having a pH of about 8.4, treating the resultant solution with caustic solution until a pH of about 10.0 is reached, and precipitating the tetra-sodium salt to permit collection thereof.

References Cited in the file of this patent

UNITED STATES PATENTS 2,234,311     Miescher et al.     Mar. 11, 1941
2,802,854     Arnold     Aug. 13, 1957

OTHER REFERENCES

Kosolapoff: Organo Phosphorus Compounds, John Wiley & Sons, New York, New York (1950), pp. 211–213.

Moeller: Inorganic Chemistry, John Wiley & Sons, pp. 639–654, New York, New York (1952).